United States Patent [19]
Vergeest

[11] Patent Number: 6,116,790
[45] Date of Patent: Sep. 12, 2000

[54] OPTICAL CONNECTOR

[75] Inventor: Henricus Jozef Vergeest, Hertogenbosch, Netherlands

[73] Assignee: The Whitaker Corporation

[21] Appl. No.: 09/202,821

[22] PCT Filed: Jun. 20, 1997

[86] PCT No.: PCT/IB97/00745

§ 371 Date: Dec. 21, 1998

§ 102(e) Date: Dec. 21, 1998

[87] PCT Pub. No.: WO98/00741

PCT Pub. Date: Jan. 8, 1998

[30] Foreign Application Priority Data

Jun. 29, 1996 [DE] Germany ................... 196 26 036

[51] Int. Cl.⁷ ..................................................... G02B 6/38
[52] U.S. Cl. .................. 385/60; 385/56; 385/55
[58] Field of Search ................... 385/60, 56, 55

[56] References Cited

U.S. PATENT DOCUMENTS

| | | | |
|---|---|---|---|
| 4,268,115 | 5/1981 | Slemon et al. | 350/96.21 |
| 4,712,861 | 12/1987 | Lukas et al. | 340/96.21 |
| 5,067,783 | 11/1991 | Lampert | 385/60 |
| 5,394,494 | 2/1995 | Jennings et al. | 385/58 |

FOREIGN PATENT DOCUMENTS

| | | | |
|---|---|---|---|
| 35 39 988 | 5/1987 | Germany | H01R 13/627 |
| 93 14 172 U | 2/1994 | Germany | G02B 6/36 |
| 94 10 298 U | 9/1994 | Germany | G02B 6/36 |
| 93 20 829 U | 4/1995 | Germany | G02B 6/36 |
| WO 94/24594 | 10/1994 | WIPO | G02B 6/38 |

*Primary Examiner*—Robert H. Kim
*Assistant Examiner*—Armando Rodriguez

[57] ABSTRACT

An optical connector with two complementary connector halves, each half having a sleeve in which a optical fiber is mounted, the sleeve is surrounded by an inner housing which is surrounded by an outer housing, and in at least one half, the sleeve is under a spring force and capable of axial movement in the inner housing and the inner housing is freely movable in the outer housing between two stops and has latching means for latching on the inner housing of a complementary connector half, the outer housing is designed in such a way that it can be moved over the inner housing both in the plugged and in the non-plugged state and it bears releasing means for opening the latching means of the associated inner housing.

8 Claims, 13 Drawing Sheets

OPTICAL CONNECTOR

BACKGROUND OF THE INVENTION

1. Field of the Invention

The invention relates to an optical connector with two complementary connector halves, each connector half having a sleeve in which at least one optical fiber is mounted, and the sleeve being surrounded by an inner housing and the latter by an outer housing, the sleeve being arranged capable of axial movement in the inner housing under a spring force, and the inner housing being arranged capable of moving freely in the outer housing between two stops.

2. Summary of the Prior Art

An arrangement having the above-named features is known from WO94/24594. Coupling two optical connector halves requires a coupling sleeve which, firstly, serves to centre the two sleeves relative to one another and, secondly, to latch the inner housing with the coupling sleeve. The coupling sleeve is thus absolutely necessary for connecting two complementary connector halves to one another.

It is further known from WO94/24594 to fasten a connector half with the coupling sleeve to one backplane, while the second connector half is fastened to a daughter board, that is to say a board arranged perpendicular to the backplane.

An optical connector is likewise known from EP 430 107 B1. In this case, one connector half has, mounted in sleeves, optical fibers which are located in an inner housing which is surrounded by an outer housing and can be moved in the latter between two stops. The second connector half has optical fibers which are likewise mounted in sleeves and are located in an enveloping housing. The first connector half can be plugged with inner housing and outer housing into this enveloping housing. In this case, the latch between inner housing and outer housing is opened by means of an appropriate opening mechanism in the second connector half. At the same time, latching occurs between the inner housing and the second connector half. If the two connectors are to be separated from one another, there is located on the outer housing of the first connector half an opening mechanism for latching between the housing of the second connector half and the inner housing of the first connector half. In the case of the optical connectors described in EP 430 107B1, similar connector halves can be coupled to one another only with the aid of a coupling sleeve.

SUMMARY OF THE INVENTION

It is the object of the invention to specify an optical connector which is composed of two complementary connector halves and can be used variably with or without a coupling sleeve.

The object is achieved by means of an arrangement having the characterizing features of Patent claim 1. Advantageous developments are specified in the subclaims. An optical connector according to the invention with two complementary connector halves has the following features: each connector half has a sleeve in which at least one optical fibre is mounted; the sleeve is surrounded by an inner housing and the latter is surrounded by an outer housing; in at least one connector half the sleeve is arranged capable of axial movement in the inner housing under a spring force; the inner housing is freely movable in the outer housing between two stops; the inner housing in each case bears latching means for latching on the inner housing of a complementary connector half; the outer housing is designed in such a way that it can be moved over the inner housing both in the plugged and in the non-plugged state; and the outer housing bears releasing means for opening the latching means of the associated inner housing.

It is possible using the optical connector according to the invention to connect two similarly designed connector halves to one another without providing a coupling sleeve.

It is particularly advantageous in this case if the outer housings and also the inner housings of the two connector halves are each of identical design. It is possible thereby to achieve a hermaphroditic configuration of the two connector halves. Such a configuration is particularly economical, since only one mould is required for each injection-moulded part, and there is no need for different moulds for each of the two complementary connector halves. The sleeve in which the optical fibers are mounted can have, for example, two centring openings or two centring pins and a multiplicity of optical fibre ends. Because of the centring by means of the centring openings and centring pins, it is possible to dispense with additional centring of the sleeves with respect to one another by means of a further sleeve, for example a coupling sleeve.

The optical connection according to the invention is particularly advantageous for connecting a plurality of optical fibers which are mounted together in a sleeve, since a deviation from an axially symmetrical form is particularly sensible with this connector, since a particularly large amount of space is thereby available for the latching means on the broad sides of the connector halves. However, it is also possible to use the optical connector to connect individual optical fibers.

It is, furthermore, particularly advantageous that the optical connector can also be used with a coupling sleeve. In this case, inner and outer housings are configured correspondingly in such a way that appropriate means are provided for latching and means are provided for opening this latch. The coupling sleeve may be provided in this case with means for latching with only one connector half, but it is also possible for said sleeve to have means for latching with both connector halves. This has the advantage that the coupling sleeve can, for example, be fastened in a backplane, and thus it is only necessary for one of the two connector halves to be accessible for the plugging operation.

BRIEF DESCRIPTION OF THE DRAWINGS

FIG. 3 shows a cross-section through the two connector halves in the non-plugged state;

FIG. 3a shows an enlargement of the plug-face ends of the two connector halves;

FIG. 5 shows a top view of a connector half according to the invention, the various parts being illustrated in dashed lines;

FIG. 8a shows two complementary connector halves with a coupling sleeve in the unplugged to the plugged state;

FIG. 8d shows the two connector halves in the completely plugged state;

DETAILED DESCRIPTION OF THE PREFERRED EMBODIMENT

Figure 1:
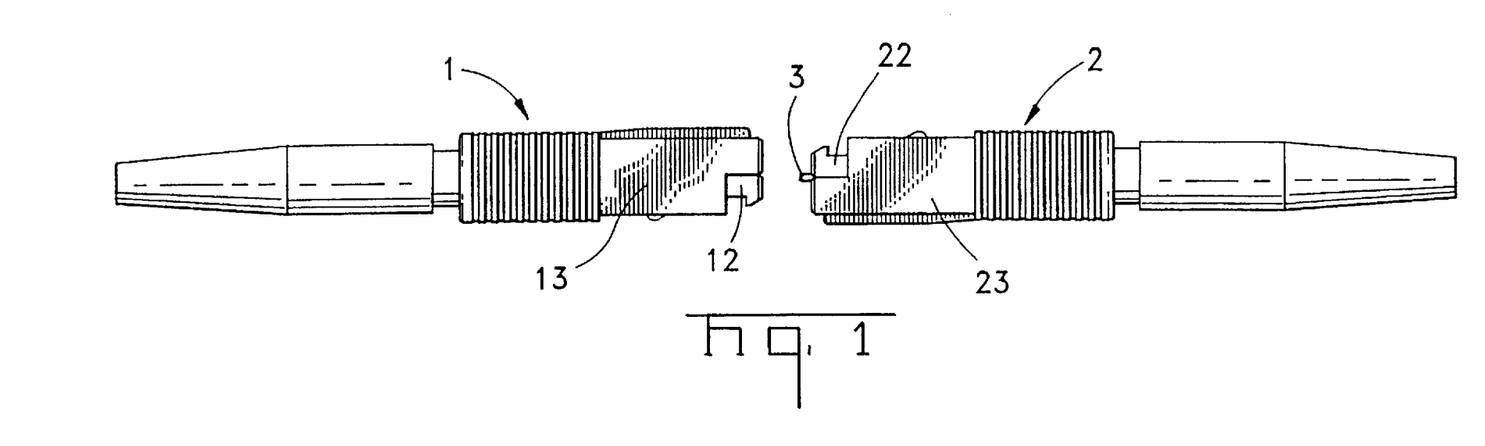
FIG. 1 shows a side view of two connector halves in the non-plugged state.
Figures 1, 2:
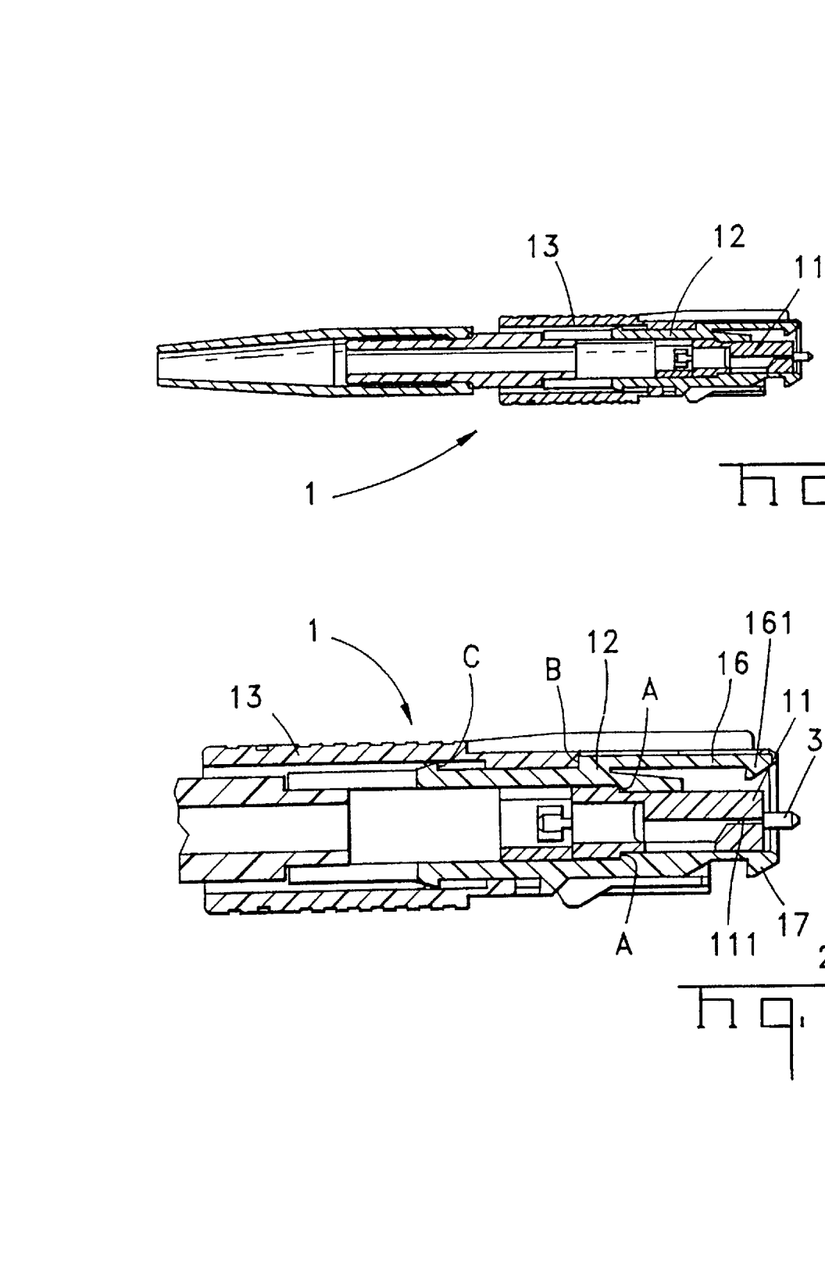
FIG. 2 shows a side view of the connector halves in the plugged state.
Figure 2:
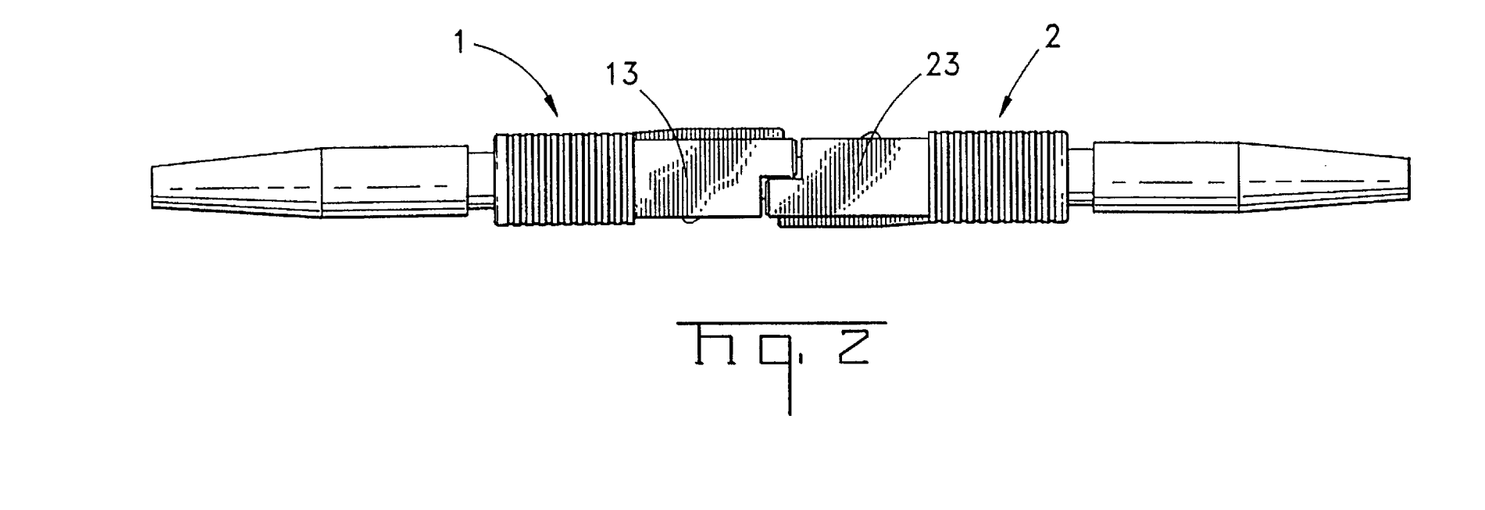

An optical connector according to the invention is represented in FIGS. 1 and 2. The two complementary connector halves 1 and 2 are represented in the non-plugged state in FIG. 1 and in the plugged state in FIG. 2. One outer housing 13 or 23, respectively, and, in part, one inner housing 12 or 22, respectively, are to be seen in each case. It is further to be seen that the two connector halves have the same external appearance except for a centring pin 3, which is part of a sleeve in which the optical fibers are mounted, and which is present only in the connector half 2. This centring pin 3 can be present either in one or the other of the connector halves. Although only one centring pin 3 is to be seen in FIG. 1, it will be seen in the explanation relating to FIG. 5 that two such centring pins are provided.

A cross-section through the two connector halves in the non-plugged state is represented in FIGS. 3 and 3a. Once again, the outer housing 13 or 23 and the inner housing 12 or 22 is to be seen in each case. Located in the inner housing in each case is a sleeve 11, 21 in which optical fibers are mounted in bores 111 and 121. If the sleeve 11, 21 is intended for fixing a plurality of optical fiber ends, for example of a ribbon cable, a plurality of bores 111 and 121 are located in a row one behind another. Moreover, centring openings are arranged in one sleeve 21 in the same plane as the bores, and corresponding centring pins are arranged in the other sleeve 11. These pins are respectively arranged to the left and to the right of the bores for the optical fibers. The sleeves 11, 21 can either be permanently connected to the inner housing 12, 22, or are subjected to a spring force and can be displaced in the axial direction in the inner housing 12, 22. The sleeves 11, 21 are pressed against a stop A in the inner housing 12, 22 by means of the spring force. As is to be seen particularly plainly in FIG. 3a, the inner housing 12, 22 respectively has a latching hook 17, 27 and an elastic latching arm 16, 26 on the opposite end. The latching arm 16, 26 has a nose 161, 261 on its free end. The outer housing 13, 23 can be displaced over the inner housing 12, 22 between the stops B and C. When the complementary connector halves 1 and 2 are joined, the oblique flanks of the noses 161 and 262 of the latching arms 16 and 26 firstly encounter the oblique flanks of the latching hooks 17 and 27. If the two connector halves are moved further onto one another, because of the oblique flanks the resilient latching arms 16 and 26 are moved away from the connector axis and latch over the latching hooks 17 and 27. During the plugging operation, the end faces of the sleeves 11, 21 touch one another, and during the plugging operation the sleeves are moved away from the stop A against the spring force. The spring force presses the end faces of the sleeves against one another, and the sleeves are fastened floating in the inner housings 12, 22, which are latched with one another. The procedure for separating the two connector halves is as follows. The two 25 outer housings 13, 23 are gripped, and the connectors are pulled apart appropriately, a releasing means on the outer housing 13, 23, which moves over the inner housing 12, 22 when pulled, bending the latching arm 16, 26 outwards and thereby releasing the latch with the latching hooks 17, 27. The releasing mechanism is not to be seen in the sections shown in FIGS. 3, 3a and 4, 4a.

Figure 4:
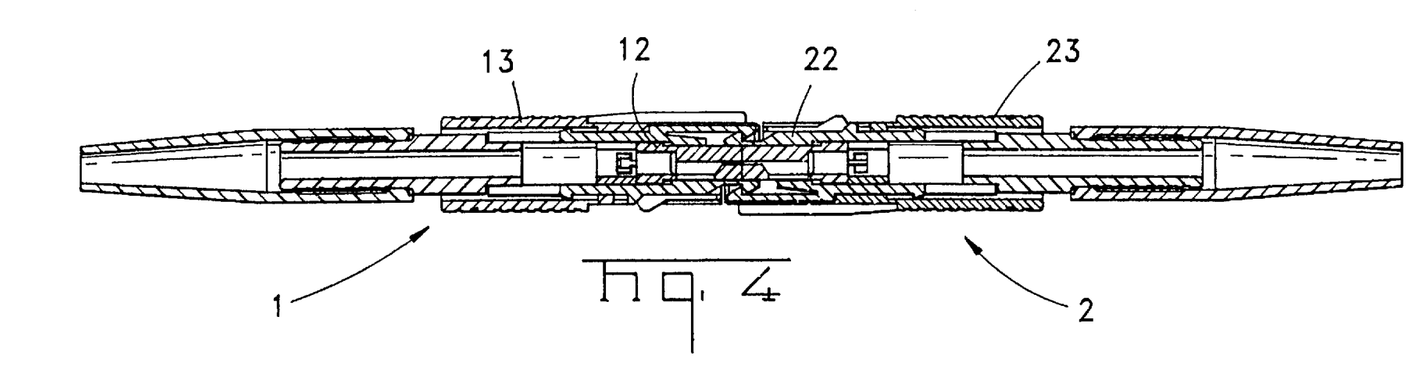
FIG. 4 shows a corresponding cross-sections in the plugged state.
Figures 4, 5B:
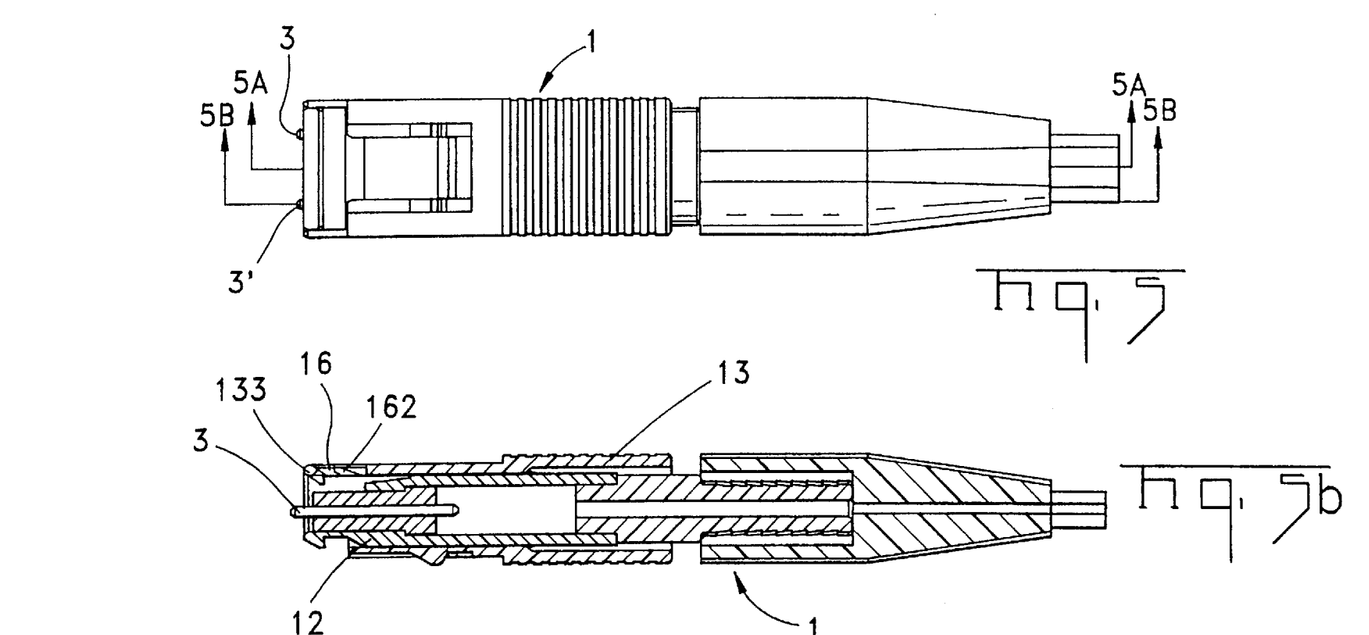
FIG. 5b shows a section along the line BB in FIG. 5.
Figure 4A:
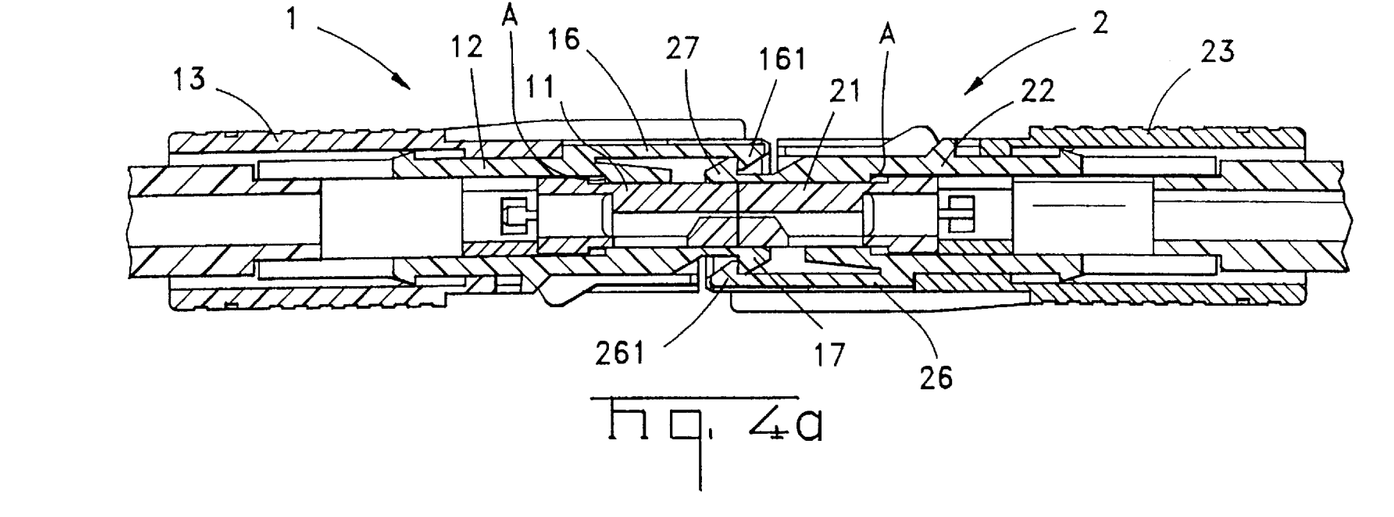
FIG. 4a shows a corresponding enlargement.
Figure 5A:
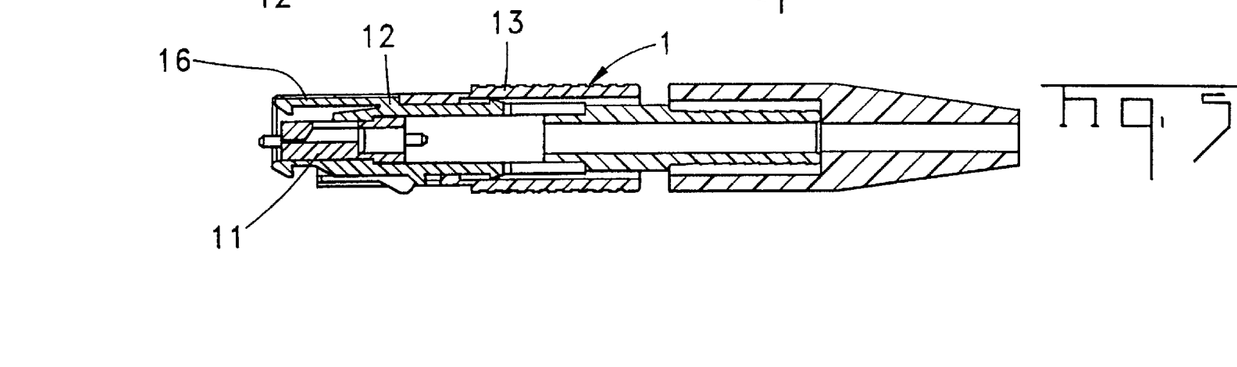
FIG. 5a shows a section along the line AA in FIG. 5.

A top view of a complementary connector half 1 is represented in FIG. 5. How the various housings are arranged is illustrated in this case by dashes in the top view. The complexity of the connector can be seen with particular ease in this case. Also to be seen is the position of the centring pins 3 and 3' of the sleeve. A curly bracket marks the region in which the optical fiber ends are located. Two lines of section A and B are also illustrated. The line of section A is the axis of symmetry of the connector, while the line of section B passes through one of the centring pins. The section in accordance with the line of section AA in FIG. 5 is represented in FIG. 5a. FIG. 5a corresponds to what is represented in FIG. 3. The section along the line BB in FIG. 5 is represented in FIG. 5b. It is to be seen here that a lug 162 is provided on the latching arm 16. If the outer housing 13 is now retracted over the inner housing 12, the releasing means 133 engages under the lug 162 and thus bends the latching arm 16 upwards, as a result of which the latch is released.

Figure 6:
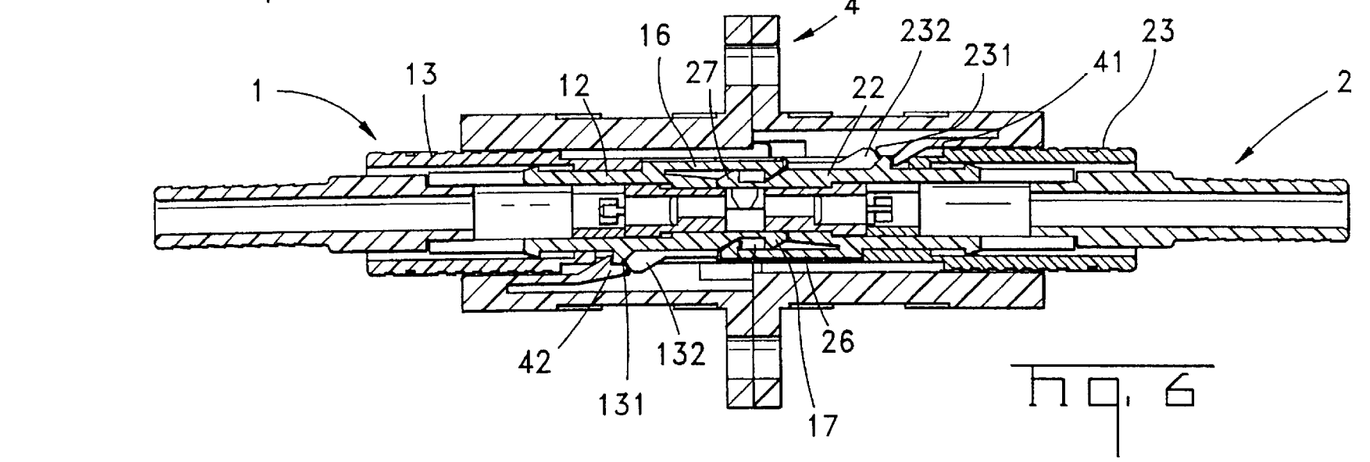
FIG. 6 shows a cross-section through two joined connector halves in a coupling sleeve in accordance with cross-section AA in FIG. 5.
Figure 6A:
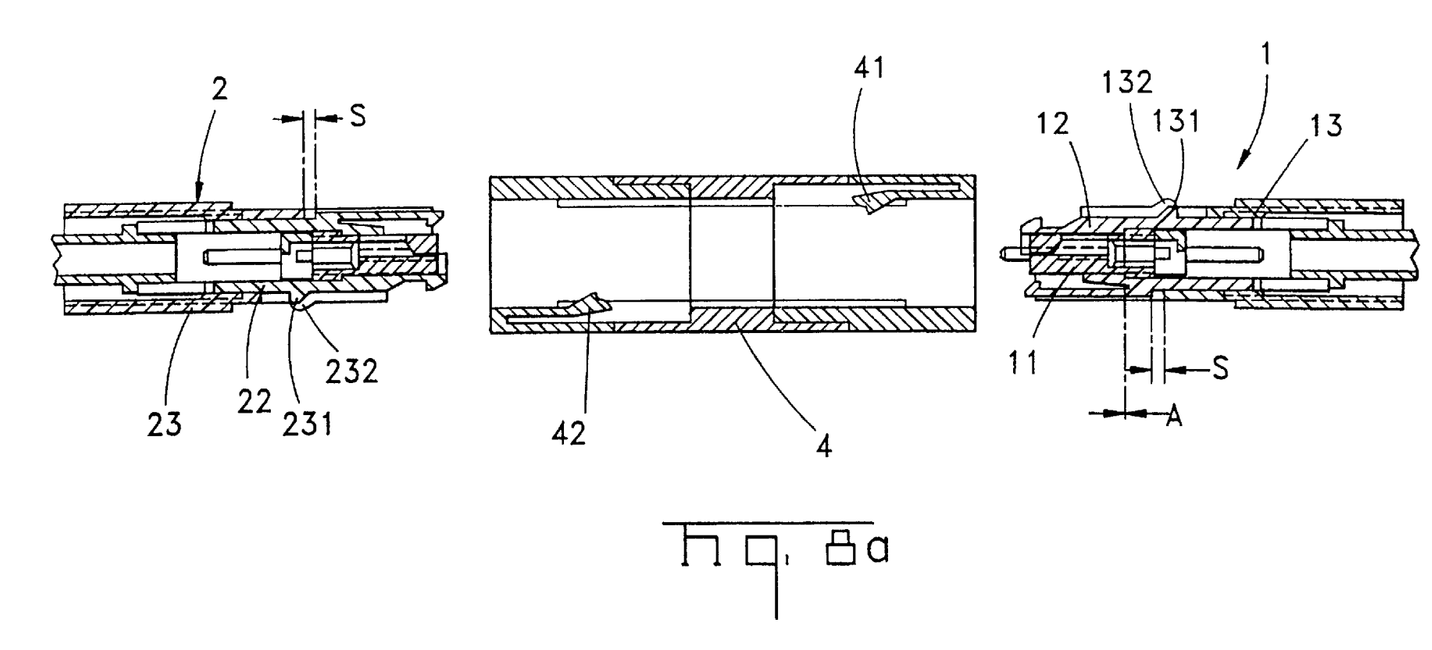
Figure 7:
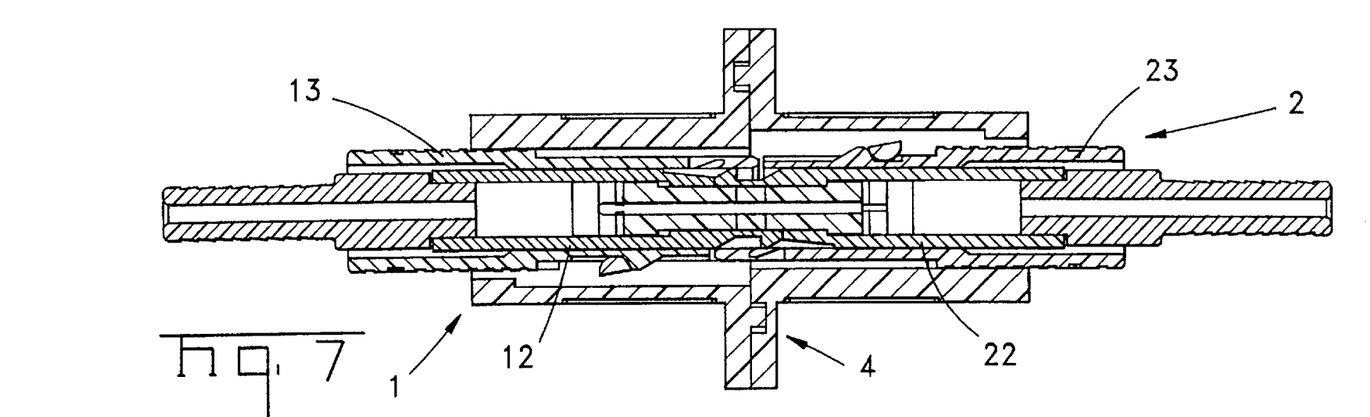
FIG. 7 shows a cross-section through two plugged connector halves in a coupling sleeve in accordance with section BB.

FIGS. 6 and 7 show two complementary connector halves 1 and 2 which are connected to one another and are located in a coupling sleeve, the representations being respectively in a section along the central axis and in a section through a centring pin. Plainly to be seen in the figures in each case are: a first connector half 1 and a second connector half 2, which are respectively inserted from opposite ends into a coupling sleeve 4. The coupling sleeve 4 has means for latching 41 and 42 with the inner housings 12 and 22 of the connector. The two connectors are latched to one another by means of the latching arms 16 or 26 and the latching hooks 17 or 27. Moreover, the inner housings have latching noses 131 and 231 which respectively latch with the means for latching 41 and 42 on the coupling sleeve 4. Again, means for opening this latch 232 and 132 are provided on the outer housing 13, 23.

The precise cooperation of the coupling sleeve and the two connector halves with inner housing and outer housing is represented in the following figures with the aid of two exemplary embodiments. These two exemplary embodiments are, however, selected only by way of example. Further simpler possibilities of using the optical connector are conceivable.

Firstly, it is possible for two complementary connector halves to be connected directly to one another with or without a coupling sleeve. It is possible here in the case of one or both connector halves for the sleeve to be movable in the inner housing under a spring force, or it is possible for the sleeve to be fastened in the inner housing in the case of one connector half. A second application is that a first connector half is mounted on a so-called daughter board, and the coupling sleeve is mounted in a backplane, and the second connector half is independent. With such an application, it is possible for both connector halves to have sleeves which are moved in the inner housing under a spring force, but it is also possible for the connector halves to have on the daughter board a sleeve fixed in the inner housing. It is also possible, furthermore, for the two connector halves to be bound to a daughter board and for the two sleeves to be held in the inner housing under a spring force. Then, as well, the two connector halves are connected to a backplane, for example, via a coupling sleeve.

FIGS. 8a to 8d represent a coupling sleeve which has means for latching 41, 42 for each of two connector halves to be connected. The two complementary connector halves 1 and 2 are designed as already described previously. The inner housing 12 or 22 respectively has a latching nose 131 or 231, and there is respectively provided on the outer housing 13 or 23 a means for opening 132 or 232 the latch between the means for latching 41 or 42 and the latching noses 131 or 132. It is shown on the first connector half 1 that the sleeve 11 is brought against the stop in the inner housing 12 by the spring force. The stop is denoted by A. It is also shown that there is a play S between the inner housing 12 and the outer housing 13. The same play s is also present in the second connector half.

Figure 8B:
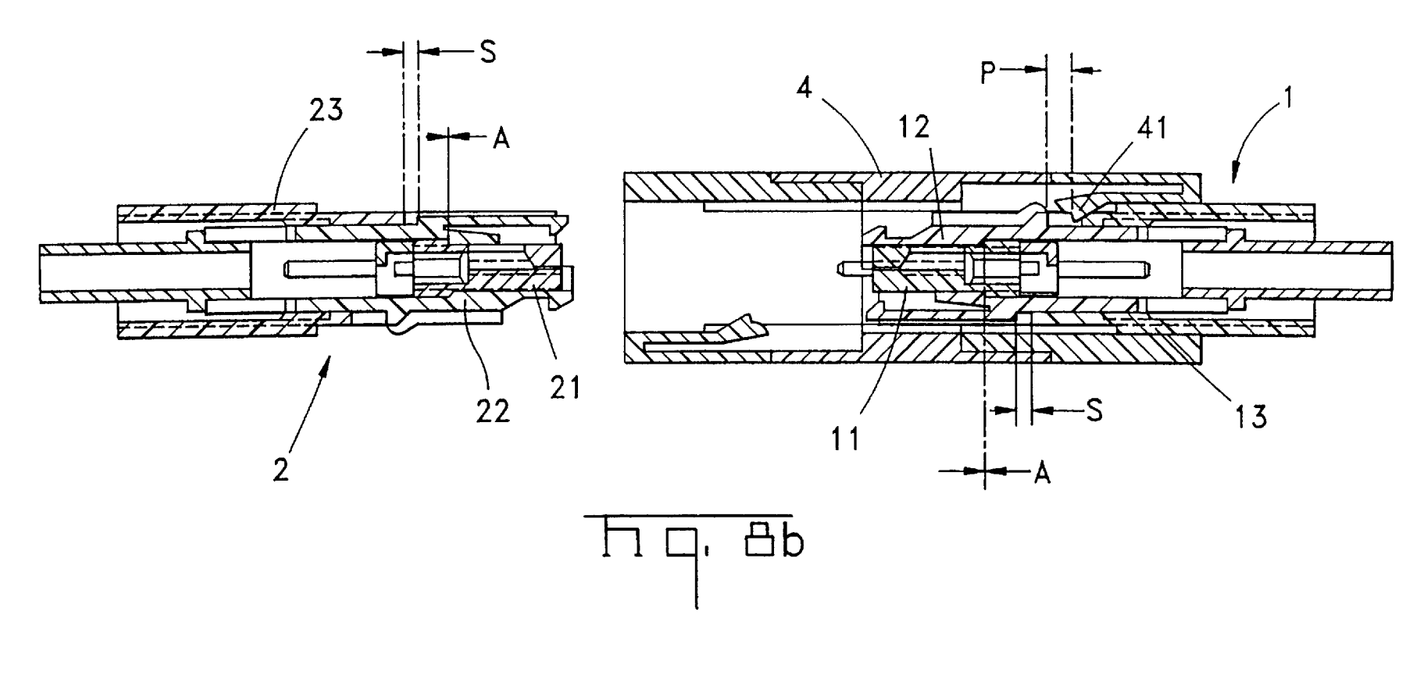
FIG. 8b shows the two connector halves in a first intermediate plugging state.

Firstly, the first connector half is inserted into the coupling sleeve 4 as represented in FIG. 8b. The sleeve 11 remains pushed against the stop A of the inner housing 12, and the play S between inner housing 12 and outer housing 13 remains unchanged. The first connector half 1 can be pushed in until the outer housing 13 runs up against the latching means 41. The inner housing 12 has a play P with respect to the coupling sleeve 4.

Figure 8C:
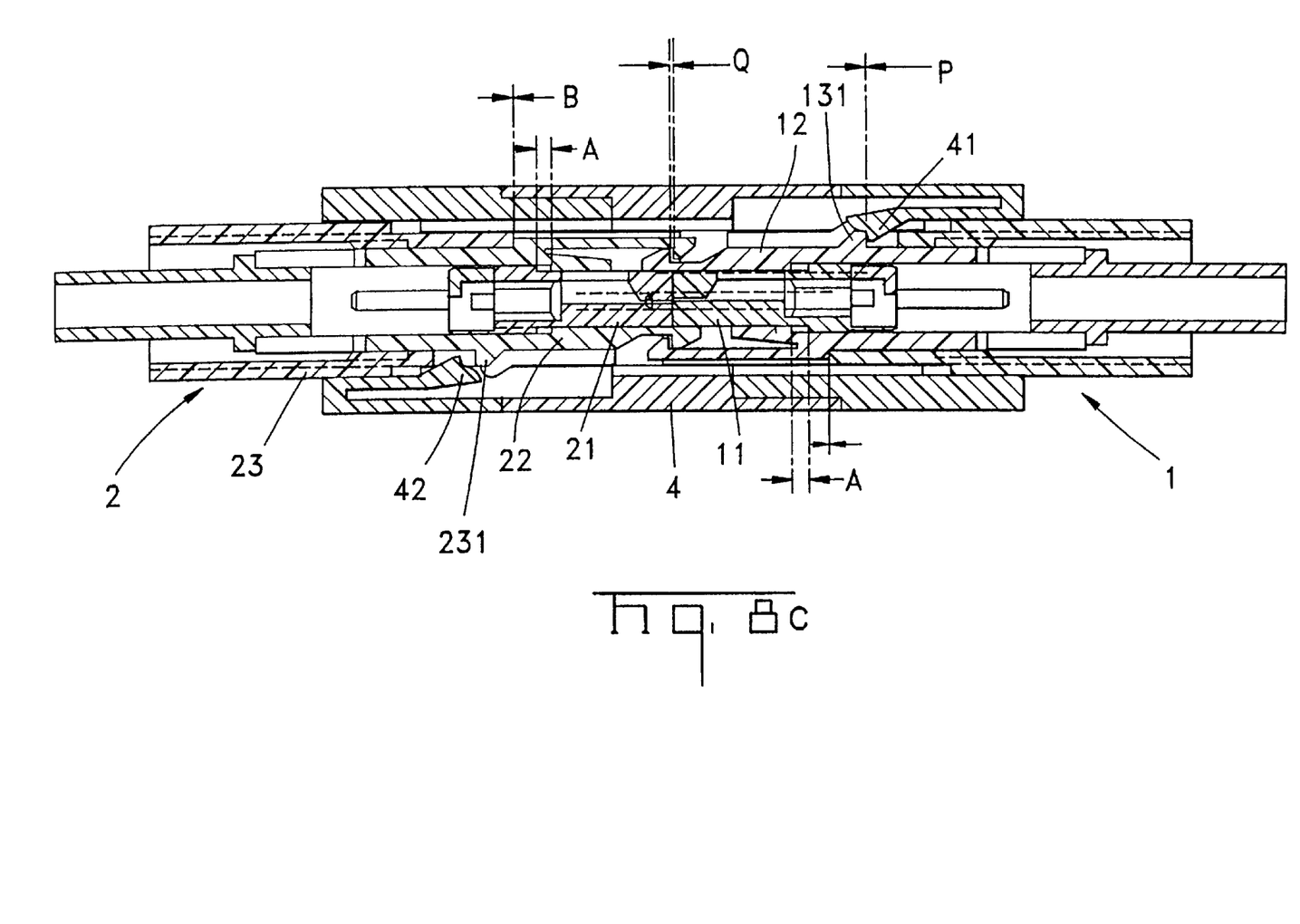
FIG. 8c shows the two connector halves in a second intermediate plugging state.
Figure 9A:
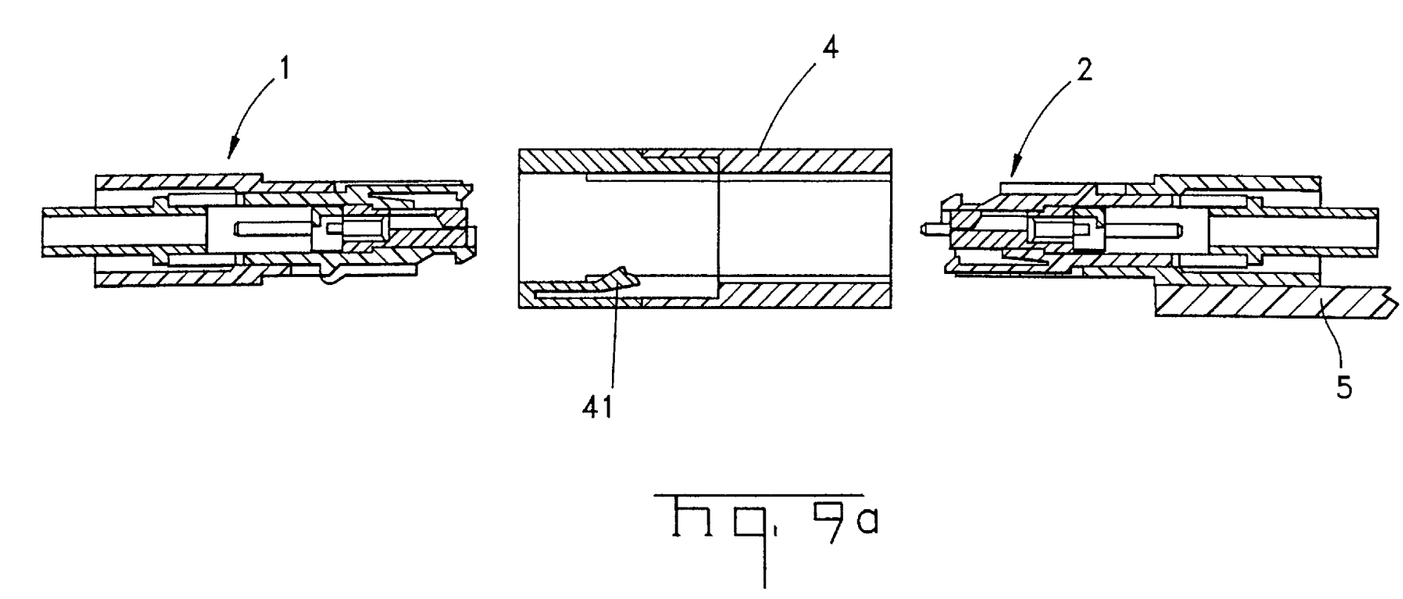
FIG. 9a shows two complementary connector halves, one being fastened to a printed circuit board, with a coupling sleeve in which only one connector half is latched in the non-plugged state.
Figure 9B:
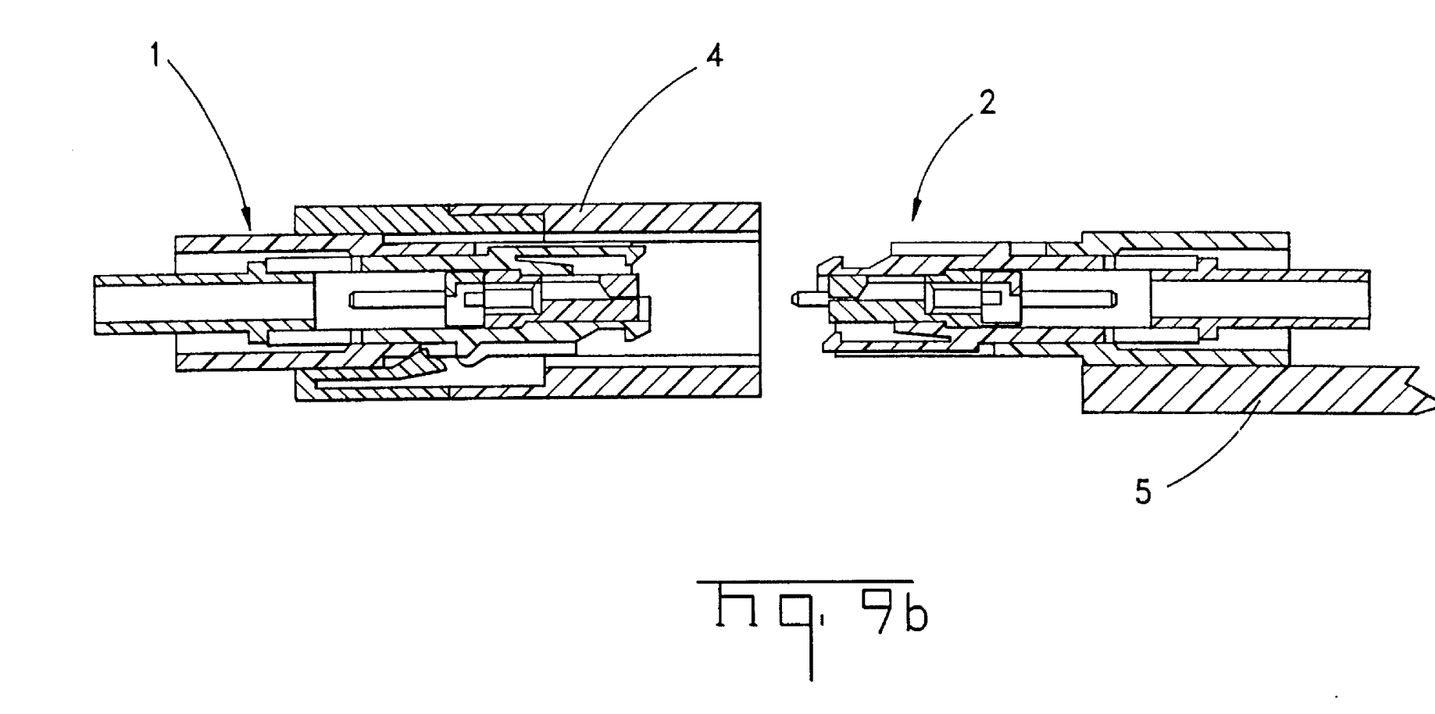
FIG. 9b shows the two connector halves in a first intermediate plugging state.
Figure 9C:
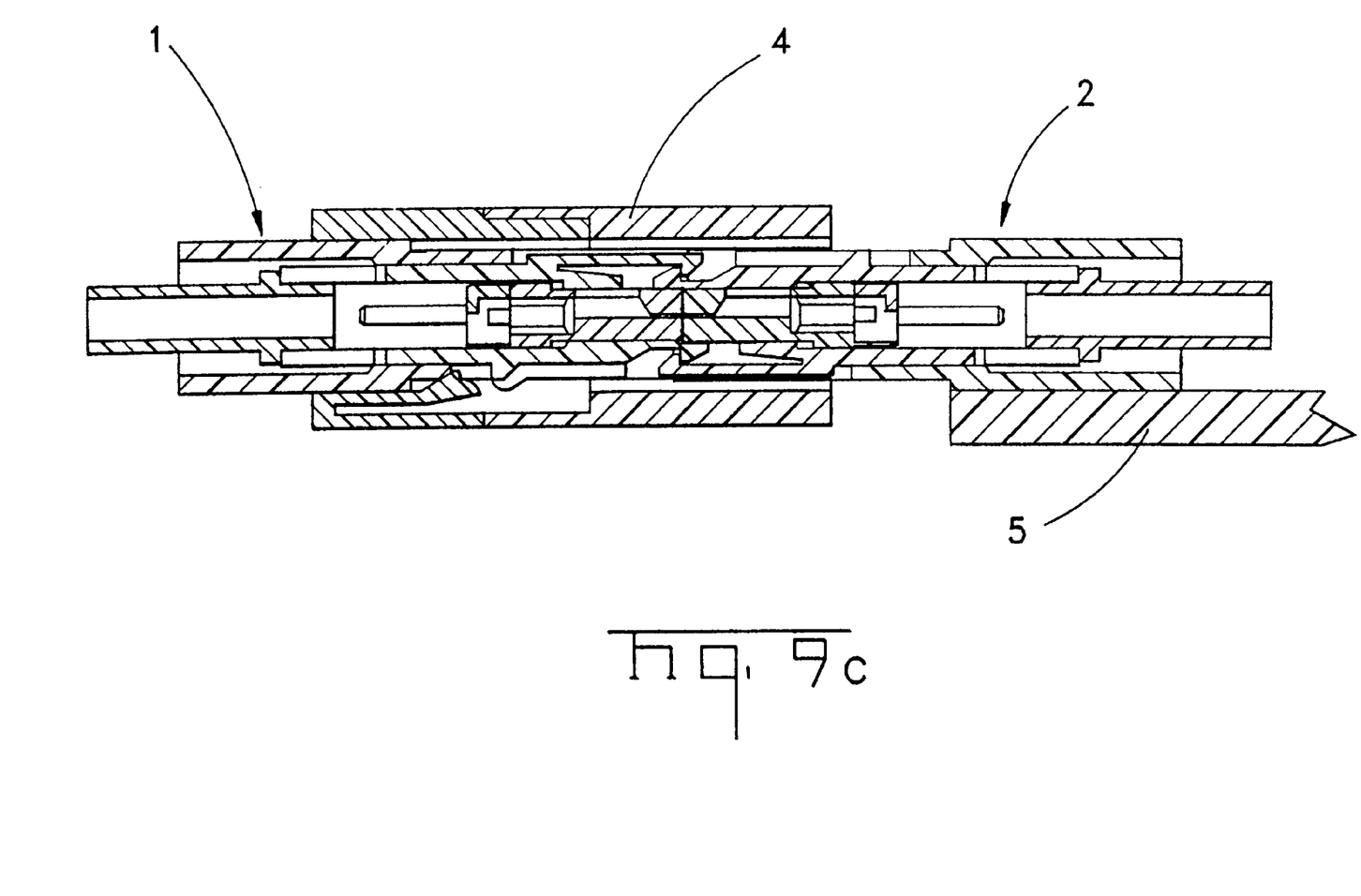
FIG. 9c shows the two connector halves in a second intermediate plugging state.
Figure 9D:
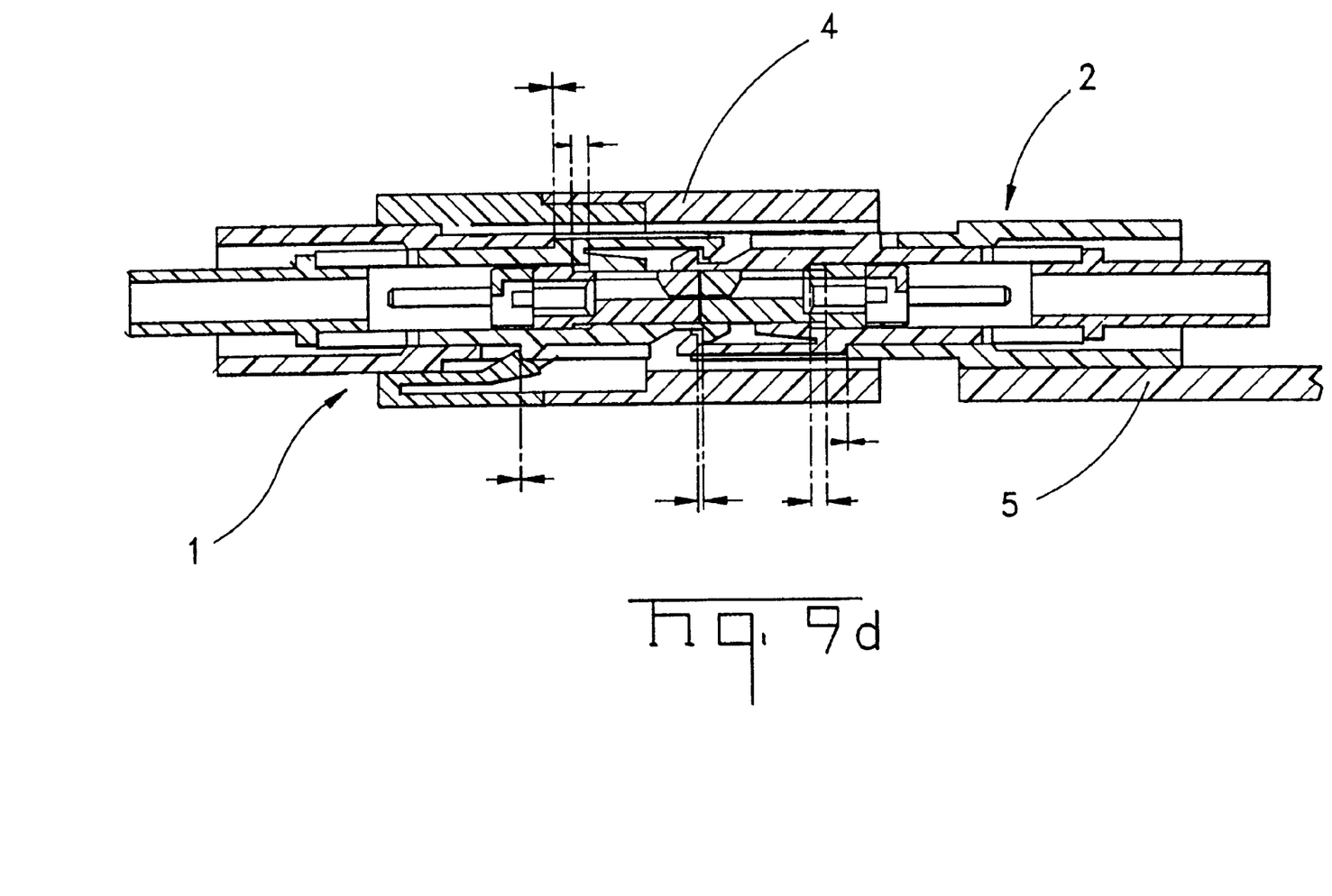
FIG. 9d shows the two connector halves in the completely plugged state.

As represented in FIG. 8c, thereafter the second connector half 2 is also inserted into the coupling sleeve 4. In this process, both the means for latching 42 are latched with the inner housing 22 via the latching nose 231, and the inner housings 22 and 12 are latched with one another. The sleeves 11 or 21 lie with their end faces against one another and are displaced with respect to the stop A by a play A'. The two inner housings 12 and 22 have a play Q with respect to one another. Because of the pressure on the end of the connector 2, the outer housing 23 is moved against the stop B of the inner housing 22, and the inner housing 12 with the latching nose 131 is moved against the latching arm 41. The two connector halves and the coupling sleeve are now in the plugged state. The two connectors are latched both with the coupling sleeve and with one another.

A pull is now exerted on the outer housing 23 of the second connector half 2 in order to open the multiple optical connection. The result is, firstly, that the outer housing 23 is moved against the stop, against the inner housing 22, and the inner housing 22 is then moved against the inner housing 12. In the process, through its means for opening 232 the outer housing opens the lock between the means for latching 42 and the latching nose 231. The second connector half is thus no longer latched with the coupling sleeve 4. By pulling further on the second connector half, a pull is also exerted on the inner housing of the first connector half, and the two outer housings 23 and 13 open the lock with the latching arms 16 and 26, with the result that the second connector half can be removed again from the coupling sleeve 4. Thereafter, the first connector half 1 can be removed from the coupling sleeve 4 by pulling on the outer housing 13.

A corresponding operation is represented in FIGS. 9a to 9d with a corresponding coupling sleeve 4 and two complementary connector halves 1 and 2. The coupling sleeve 4 provides means for latching 41 only for the connector half 1. The second connector half 2 is connected to a board. Firstly, the first connector half 1 is inserted into the coupling sleeve 4, and thereafter the second connector half 2 is inserted. In the process, the second connector half 2 does not latch with the coupling sleeve 4, but only with the first connector half 1.

What is claimed is:

1. An optical connector comprising two complementary connector halves that when separated define a non-plugged state and when joined together define a plugged state, each connector half having:

a sleeve for mounting an optical fiber;

an inner housing that partially surrounds the sleeve and includes a latch structure for latching to the inner housing of the other connector half when in the plugged state; and an outer housing that partially surrounds the inner housing which is slidable therein, the outer housing including a releasing member for unlatching the latch structure of the inner housing by pulling on the outer housing;

where, in at least one connector half, the sleeve is slidable within the inner housing and the sleeve is resiliently biased therein.

2. The optical connector according to claim 1, characterized in that the outer housings of the connector halves are hermaphroditic.

3. The optical connector according to claim 2, characterized in that the inner housings of the connector halves are hermaphroditic.

4. The optical connector according to claim 1, characterized in that the inner housing has latching members on two opposite sides, a latching hook being provided on one side, and an elastic latching arm with a nose being provided on the other side.

5. The optical connector according to claim 4, characterized in that the releasing member of the outer housing is designed such that when there is an axial pull on the outer housing opposite the plugging direction, the releasing means acts on the elastic latching arm.

6. The optical connector according to claim 1, characterized in that the sleeve has two centering features, and a multiplicity of optical fiber ends may be mounted in the sleeve.

7. The optical connector according to claim 1, characterized in that a coupling sleeve is provided into which the connector halves can be inserted from opposite ends, and the coupling sleeve has latches for latching with at least the inner housing of the connector half.

8. The optical connector according to claim 7, characterized in that the inner housing has a latching nose for latching with the coupling sleeve and the outer housing has a release feature for opening the latch.

* * * * *